United States Patent [19]

Shirley et al.

[11] Patent Number: 5,082,474

[45] Date of Patent: Jan. 21, 1992

[54] PRESSURIZATION PSA SYSTEMS FOR THE PRODUCTION OF HIGH PURITY PRODUCT GAS

[75] Inventors: Arthur I. Shirley, South Orange; Alberto I. LaCava, South Plainfield, both of N.J.

[73] Assignee: The BOC Group, Inc, Murray Hill, New Providence, N.J.

[21] Appl. No.: 567,487

[22] Filed: Aug. 14, 1990

[51] Int. Cl.$^5$ ............................................. B01D 53/04
[52] U.S. Cl. ............................................. 55/26; 55/58; 55/62; 55/68; 55/74; 55/75
[58] Field of Search .............. 55/25, 26, 58, 62, 68, 55/74, 75

[56] References Cited

U.S. PATENT DOCUMENTS

| | | | |
|---|---|---|---|
| 3,891,411 | 6/1975 | Meyer | 55/26 |
| 3,923,477 | 12/1975 | Armond et al. | 55/25 |
| 4,144,037 | 3/1979 | Armond et al. | 55/62 X |
| 4,256,469 | 3/1981 | Leitgeb | 55/25 |
| 4,264,339 | 4/1981 | Jüntgen et al. | 55/25 |
| 4,348,213 | 9/1982 | Armond | 55/25 |
| 4,376,639 | 3/1983 | Vo | 55/26 |
| 4,415,340 | 11/1983 | Knoblauch et al. | 55/25 |
| 4,440,548 | 4/1984 | Hill | 55/26 |
| 4,548,799 | 10/1985 | Knoblauch et al. | 55/26 X |
| 4,572,723 | 2/1986 | Ward | 55/25 |
| 4,756,723 | 7/1988 | Sircar | 55/25 |
| 4,761,165 | 8/1988 | Stöcker et al. | 55/26 X |
| 4,810,265 | 3/1989 | Lagree et al. | 55/26 |
| 4,816,039 | 3/1989 | Krishnamurthy et al. | 55/26 |
| 4,853,004 | 8/1989 | Kaplan et al. | 55/25 |
| 4,892,566 | 1/1990 | Bansal et al. | 55/26 |
| 4,925,461 | 5/1990 | Gemba et al. | 55/58 X |

*Primary Examiner*—Robert Spitzer
*Attorney, Agent, or Firm*—Robert I. Pearlman; Coleman R. Reap

[57] ABSTRACT

Processes for the production of an inert gas-rich product gas from pressure swing adsorption are provided wherein the pressurization step is carried out by the use of feed gas only in a two step late feed profile, or by product gas and feed gas with the feed gas entering in either a typical one-step feed profile or in the two step late feed profile above.

28 Claims, 5 Drawing Sheets

| TIME(SEC) VALVE POSITION | | 4 | 56-116 | 4 | 56-116 |
|---|---|---|---|---|---|
| | | | FULL CYCLE SEQUENCE | | |
| FEED TO BED A | 01 | | ▨ | | |
| FEED TO BED B | 02 | ▨ | | | ▨ |
| BOTTOM BALANCE | 03 | | | ▨ | |
| BOTTOM BALANCE | 04 | ▨ | | ▨ | |
| BED A VENT | 05 | | | | ▨ |
| BED B VENT | 06 | | ▨ | | |
| TOP BALANCE A | 07 | | | ▨ | |
| TOP BALANCE B | 08 | ▨ | | ▨ | |
| PRODUCT FROM BED A | 09 | | ▨ | | |
| PRODUCT FROM BED B | 10 | | | | ▨ |

▨ OPEN
☐ CLOSED

| TIME(SEC) VALVE POSITION | | 4 | 56-116 | 4 | 56-116 | |
|---|---|---|---|---|---|---|
| FEED TO BED A | 01 | | ▨ | | | |
| FEED TO BED B | 02 | ▨ | | ▨ | ▨ | |
| BOTTOM BALANCE | 03 | ▨ | | ▨ | | |
| BOTTOM BALANCE | 04 | | | | ▨ | |
| BED A VENT | 05 | | ▨ | | | |
| BED B VENT | 06 | | | | ▨ | |
| TOP BALANCE A | 07 | | | | ▨ | |
| TOP BALANCE B | 08 | | ▨ | | | |
| PRODUCT FROM BED A | 09 | ▨ | | ▨ | | |
| PRODUCT FROM BED B | 10 | | | | | ▨ |
| BACKFILL TO BEDS | 11 | | | ▨ | | |
| BACKFILL TO BEDS | 12 | | ▨ | | | |

FULL CYCLE SEQUENCE

▨ OPEN
☐ CLOSED

FIG. 13

PRESSURIZATION PSA SYSTEMS FOR THE PRODUCTION OF HIGH PURITY PRODUCT GAS

TECHNICAL FIELD

The present invention relates to the production of an inert product gas from a feed gas containing at least one inert gas and impurities, utilizing pressure swing adsorption techniques. More particularly, this invention relates to a cyclic process wherein the treatment zone is repressurized to production pressure either by feed gas alone fed in an initial slow stage followed by a rapid second stage, or by production gas and feed gas with the feed gas being introduced in a one stage profile or in a two stage profile as described above.

BACKGROUND OF THE PRIOR ART

Adsorption techniques have been used in the separation and in the production of a variety of gases including hydrogen, helium, argon, carbon monoxide, carbon dioxide, nitrous oxide, oxygen, and nitrogen. Feed gases useful in these adsorption separations include air; refinery off-gases; and land-fill, flue, and natural gases.

Figure 1:
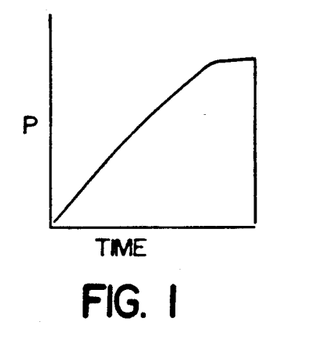
FIG. 1 is a graphic illustration of the pressure history of a PSA system pressurized with a constant pressure pressurization step.
Figure 2:
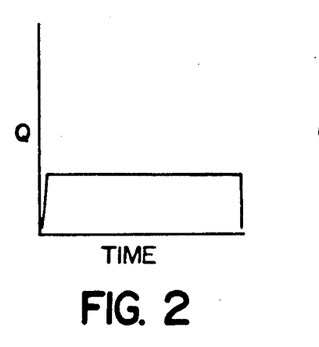
FIG. 2 is a graphic illustration of the feed flow history of a PSA system pressurized with a constant pressure pressurization step as in FIG. 1.
Figure 3:
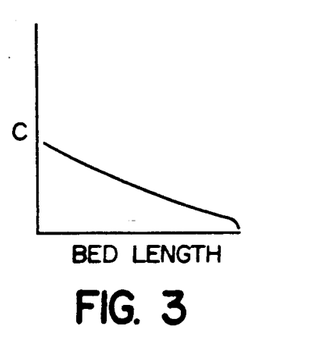
FIG. 3 is a graphic illustration of the concentration profile of impurities in interstitial gas at the end of the pressurization step of FIG. 1.

Pressure swing adsorption (PSA) processes typically involve the cyclical pressurization, production, and regeneration of adsorbent beds or treatment zones to achieve a product of a specified purity. The pressurization step is usually carried out at a constant rate. This type of system is graphically illustrated in FIGS. 1-3. FIG. 1 represents a constant pressure pressurization step. FIG. 2 corresponds to the feed flow rate corresponding to the pressurization history in FIG. 1. FIG. 3 represents the hypothetical concentration profile of the impurities in the interstitial gas at the end of the pressurization step corresponding to FIG. 1, as a function of bed length. The feed rate for the constant pressure history is flat, and therefore, the final concentration profile should be higher in purity at the production end and lower at the injection end.

However, such processes for the production of inert gases having an oxygen content below 100 vpm (0.01%) from air are inefficient. PSA designs having multiple treatment zones are more effective for obtaining highly pure inert gases, but the cost for such systems are much higher than traditional two-zone PSA plants. The purity of a gas product of a PSA process is determined by the differences in the uptake rates of the feed gas components which in turn is dependent upon the length of time the feed gas is in contact with the adsorbent in the treatment zone. The initial product coming out of the treatment zone has the shortest residence time and is therefore of the lowest purity. The purity expectedly improves with time and then decreases as the adsorption wave approaches the bed exit.

A catalytic combustion unit is occasionally combined with a PSA plant when very low oxygen concentration is required. The PSA plant is operated to produce inert gas with oxygen concentrations between 10,000 and 1,000 vpm (1.0 and 0.1 percent, respectively) which is then combusted to produce a final inert gas containing 100 vpm or less of oxygen. This operation is costly, however, as the catalytic units and the fuel used in the combustion are expensive. Furthermore, it is necessary to remove the combustion products from the effluent of the catalytic unit.

Armond et al., U.S. Pat. No. 4,144,037, disclose a process for gas separation wherein the gaseous mixture is drawn through an absorbent bed in a substantially unpressurized condition by applying reduced pressure to the outlet of the bed.

Leitgeb, U.S. Pat. No. 4,256,465, offsets the initial low purity surge of product gas of a typical constant pressurization PSA system by slowing the PSA process concentration wave as it moves through the treatment zone. This was done by multi-stage pressurization where the final stage was conducted substantially more slowly than the initial stage. The Leitgeb process actually makes use of a lengthy adsorption time before product is taken though, and does not depend on the pressurization rates.

Figure 4:
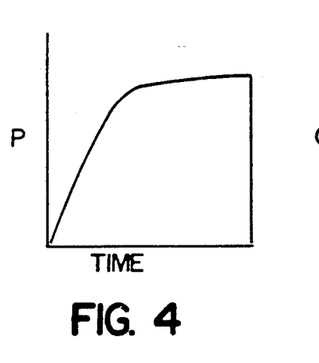
FIG. 4 is a graphic illustration of the pressure history of a PSA system pressurized with feed gas with a rapid initial stage and a slow final stage.
Figure 5:
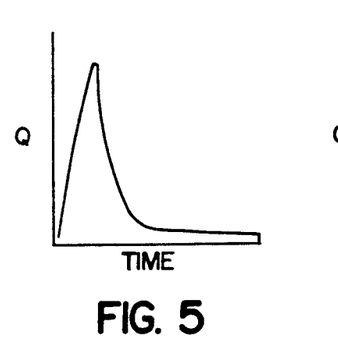
FIG. 5 is a graphic illustration of the feed flow history of a PSA system pressurized with a rapid initial stage and a slow final stage as in FIG. 4.
Figure 6:
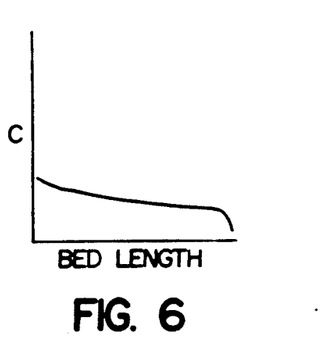
FIG. 6 is a graphic illustration of the concentration profile of impurities in interstitial gas at the end of the pressurization step of FIG. 4.

This type of a system is graphically illustrated in FIGS. 4-6. FIG. 4 represents a rapid initial pressurization followed by a slow pressurization at the end of the pressurization step. FIG. 5 corresponds to the feed flow rate corresponding to the pressurization history in FIG. 4. FIG. 6 represents the hypothetical concentration profile of the impurities in the interstitial gas at the end of the pressurization step corresponding to FIG. 4, as a function of bed length. The feed rate for this "early" pressure history is initially so fast that the bed comes up to pressure before a lot of the feed gas is adsorbed. Consequently, the resultant final concentration history is flat, and the purity of the initial product is low. Therefore, a PSA plant operating with an early feed history on a given cycle and at specified feed and product rates would produce the lowest purity.

Ward, U.S. Pat. No. 4,572,723, discloses a process for the production of low oxygen content nitrogen product gas wherein the cycle time is preferably 500 seconds and the pressure is allowed to rise at a constant slow rate. U.K. Patent Application No. 2 195 097 describes a PSA gas separation wherein the product gas returns whenever the pressure in a product gas reservoir exceeds that of the treatment zone.

Japanese Patent Publication No. 63-79714 discloses a three treatment zone merry-go-round PSA system wherein at any given time, two serially connected treatment zones are used for adsorption while a third treatment zone is regenerated.

The PSA processes of the present invention alleviate the problems of the prior art by the cost-effective production of substantially pure product gas by a two step slow/fast pressurization with feed gas or by product gas pressurization in combination with one step or two step slow/fast feed gas pressurization.

SUMMARY OF THE INVENTION

The process of the present invention, in its broadest aspects is directed to the production of a highly purified inert gas through the use of a pressure swing adsorption system in which the treatment zone is repressurized to a production pressure by either a method employing a feed gas alone or in combination with the product gas.

In particular, the present invention relates to a process for the production of highly purified inert product gas from a feed gas containing an inert gas and impurities comprising (a) pressurizing to a production pressure a treatment zone comprising an inlet region, an outlet region, and at least one impurity adsorbing material by (i) introducing the product gas into the outlet region to raise the pressure of the treatment zone to an intermediate pressure less than the production pressure; and (ii) introducing the feed gas into the inlet region to raise the pressure of the treatment zone to the production pressure; (b) introducing the same or a different feed gas into the production pressurized treatment zone through the inlet region to remove the impurities and to produce the highly purified inert product gas; and (c) removing the inert product gas from the outlet region.

In a preferred embodiment of the invention, the pressurization step (a) is carried out by (i) first slowly introducing the feed gas for an initial period into the inlet region to raise the pressure of the treatment zone to an intermediate pressure less than the production pressure; subsequently (ii) rapidly introducing the same or a different feed gas for a second period less than the initial period into the inlet region to raise the pressure of the treatment zone to the production pressure; and optionally (iii) introducing the same or a different feed gas as in step (i) or (ii) for a further period to raise further the pressure of said treatment zone.

In another embodiment of the invention, the pressurization step (a) comprises (i) introducing the product gas into the outlet region to raise the pressure of the treatment zone to a first intermediate pressure less than the production pressure and (ii) (1) first slowly introducing the feed gas for an initial period into the inlet region to raise the pressure of the treatment zone to a second intermediate pressure which is less than the production pressure but greater than the pressure of the treatment zone after it has optionally been regenerated; and subsequently (2) rapidly introducing the same or a different feed gas for a period less than the initial period into the inlet region to raise the pressure of the treatment zone to the production pressure; and optionally (3) introducing the same or a different feed gas as in step (1) or (2) for a further period to raise further the pressure of said treatment zone.

The step of removing the product gas from the outlet region (Step C) preferably comprises (i) simultaneously removing the inert product gas from the outlet region; (ii) sequentially removing the inert product from the outlet region; or (iii) a combination of (i) and (ii).

The process of the present invention preferably includes the regeneration of the treatment zone to remove impurities therefrom which is particularly desired for the continuous production of product gas.

Furthermore, any of these processes may be performed in a single treatment zone or in a plurality of treatment zones. When conducted in a plurality of treatment zones, at least one of the treatment zones is used to remove the impurities from the feed gas and at least one of the treatment zones is simultaneously regenerated to remove impurities therein to thereby allow the process to run continuously.

BRIEF DESCRIPTION OF THE DRAWINGS

The following drawings are illustrative of embodiments of the present invention and are not intended to limit the scope of the invention as encompassed by the claims forming part of the application.

DETAILED DESCRIPTION OF THE INVENTION

The present invention is directed to a PSA system wherein high purity inert gas is produced by passing a feed gas through a treatment zone, adsorbing a majority of the impurities from the gas, and withdrawing a purified product gas from the treatment zone. It has been found with the pressurization techniques of the present invention, that the efficiency of the PSA system in producing the high-purity inert product gas is substantially increased.

The PSA processes of the present invention, in general, can be carried out using any adsorbent material having selectivity for one or more of the impurities of the gaseous feed mixture. Suitable adsorbents include zeolite molecular sieves, zeolites, activated carbon, carbon molecular sieves, silica compounds, aluminum compounds and the like. The difference between the amounts of the impurities adsorbed at the lowest and highest pressures during the PSA cycle determine the efficiency of the separation. In accordance with the invention, the treatment zone may contain one or more different adsorbents.

The present processes may be conducted either batchwise or continuously. In either case, the treatment zone must be periodically regenerated by purging the accumulated adsorbed impurities if the treatment zone is to be reused. In a batchwise system, purification of the feed gas must be stopped during regeneration of the treatment zone. In a continuous system, a plurality of treatment zones are used with at least one treatment zone producing purified gas while at least one other treatment zone is undergoing regeneration.

Figure 7:
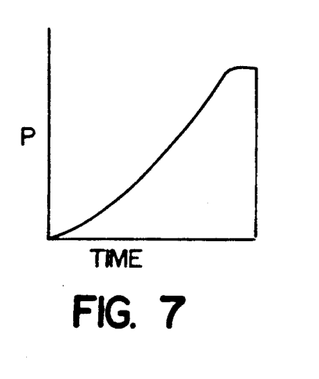
FIG. 7 is a graphic illustration of the pressure history of a PSA system pressurized with feed gas with a slow initial stage and a rapid final stage.
Figure 8:
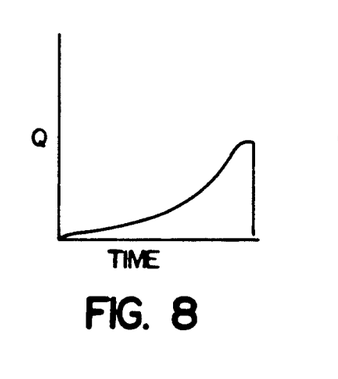
FIG. 8 is a graphic illustration of the feed flow history of a PSA system pressurized with a slow initial stage and a rapid final stage.
Figure 9:
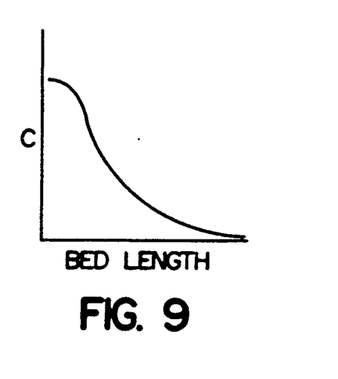
FIG. 9 is a graphic illustration of the concentration profile of impurities in interstitial gas at the end of the pressurization step of FIG. 7.

In a preferred embodiment, the feed gas pressurization is carried out in two stages, the first stage comprising a slow introduction of feed gas for an initial period into the inlet region of the treatment zone in order to raise the pressure of the treatment zone to an intermediate pressure. The intermediate pressure is less than the production pressure of the system yet greater than the pressure of the treatment zone after regeneration. In a subsequent stage, the same or different gas is rapidly introduced for a second period, which is less than the initial period, into the inlet region of the treatment zone in order to raise the pressure of the treatment zone to the production pressure. This type of "late" pressurization is illustrated by FIG. 7. FIG. 8 corresponds to the feed flow rate corresponding to the pressurization history in FIG. 7. FIG. 9 represents the hypothetical concentration profile of the impurities in the interstitial gas at the end of the pressurization step corresponding to FIG. 7, as a function of bed length. Therefore, when compared with the pressurization profiles, feed histories, and impurity concentrations of prior art FIGS. 1-3 and FIGS. 4-6, the "late" pressurization and feed history of the process of the present invention yields the highest purity of product gas.

A typical full cycle of the PSA unit in the present process with two step late profile feed gas pressurization is as follows:

FLOWCHART 1

Figure 10:
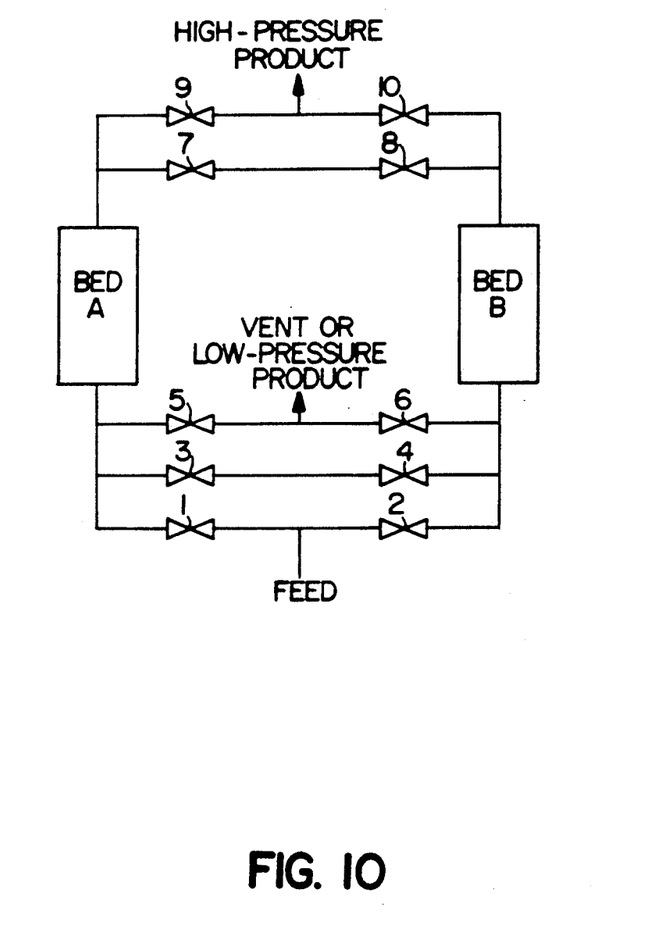
FIG. 10 is a schematic diagram of a conventional two zone PSA process for the production of inert-gas rich product gas.

Step 1: Slow Pressurization by Feed Gas to Intermediate Pressure
Step 1: Rapid Pressurization by Feed Gas to Production Pressure
Step 3: Continued Feed and Product Release
Step 4: Regeneration A conventional two zone process with constant pressure feed pressurization is shown schematically in FIG. 10. Here, the valves controlling flow of the feed gas into the system, high-pressure product withdrawal and waste gas venting from treatment zones A and B are numbered 1 through 10. A full cycle on conventional PSA units as shown in FIG. 10 is as follows:

| FLOW CHART II | | |
|---|---|---|
| STEP | TREATMENT ZONE A | TREATMENT ZONE B |
| 1 | Pressurization | Regeneration |
| 2 | Continued Feed and Product Release | Regeneration |
| 3 | Regeneration | Pressurization |
| 4 | Regeneration | Continued Feed and Product Release |

Figure 11:
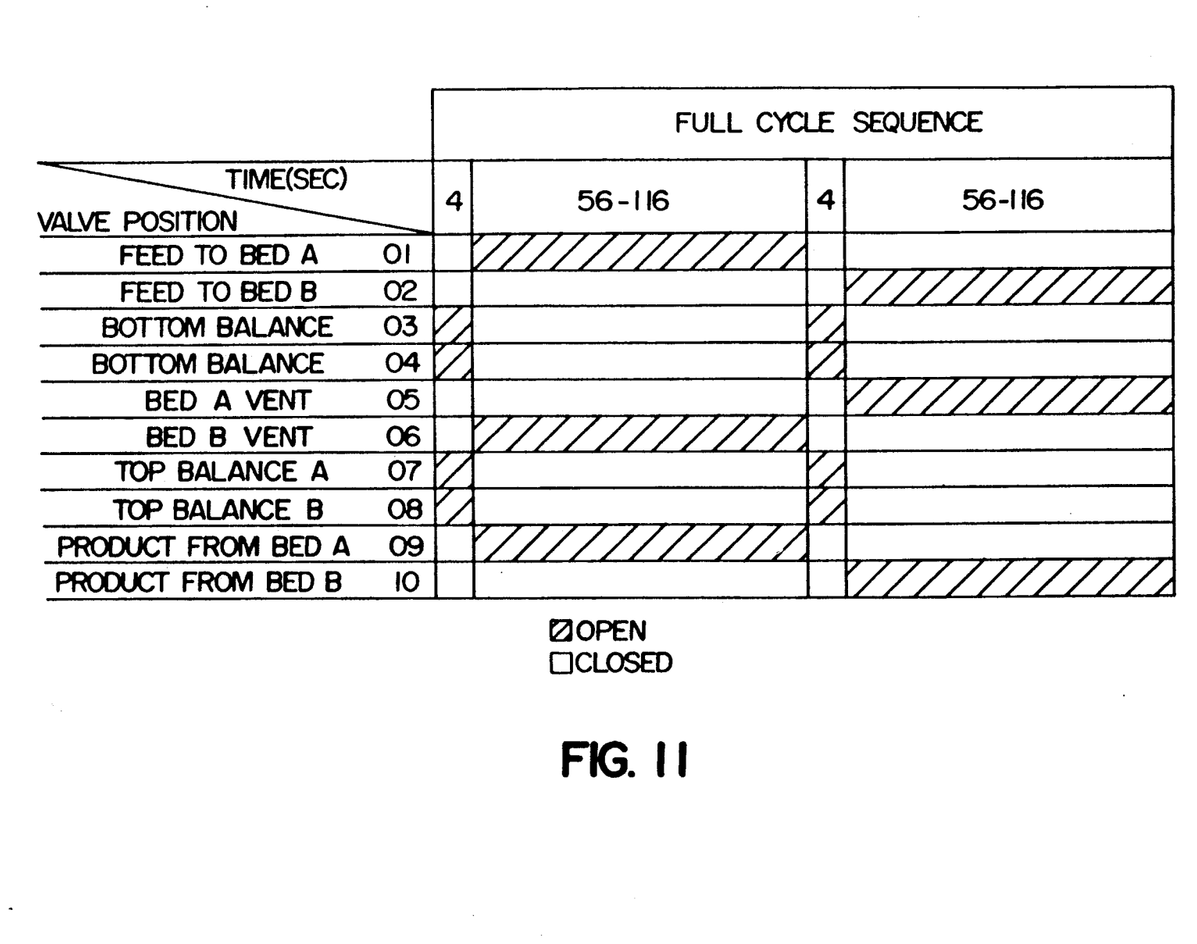
FIG. 11 is a chart of the sequence of steps in the PSA cycle using the PSA system shown in FIG. 10.

Typical timing and valve positions are shown in FIG. 11 using a full cycle time between 120 and 240 seconds.

Figure 12:
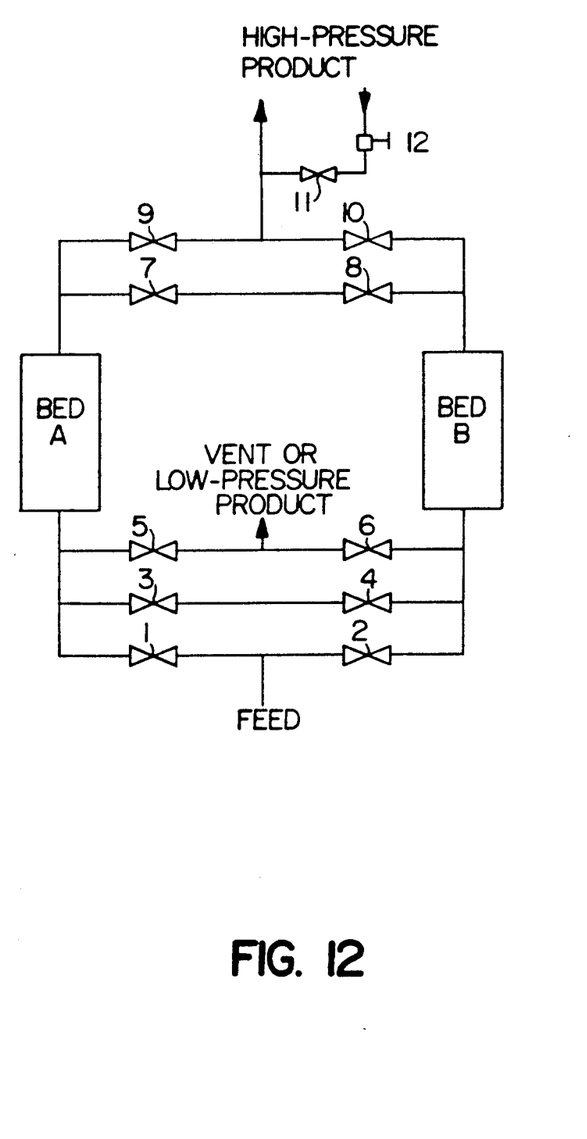
FIG. 12 is a schematic diagram of a PSA system comprising two treatment zones for the production of inert-gas rich product gas in accordance with the present invention.

An embodiment of the present invention as a two zone PSA process with the equipment necessary for the pressurization techniques of the present invention is shown schematically in FIG. 12. In FIG. 12, the valves controlling flow of feed into the PSA system, product withdrawal, and waste gas venting from treatment zones A and B are numbered 1 through 13. A typical full cycle on the PSA unit incorporating two step "late" profile pressurization with feed gas in accordance with the present invention is as follows:

| FLOW CHART III | | |
|---|---|---|
| STEP | TREATMENT ZONE A | TREATMENT ZONE B |
| 1 | Slow Pressurization by Feed Gas to Intermediate Pressure | Regeneration |
| 2 | Rapid Pressurization by Feed Gas to Production Pressure | Regeneration |
| 3 | Continued Feed and Product Release | Regeneration |
| 4 | Regeneration | Slow Pressurization by Feed Gas to Intermediate Pressure |
| 5 | Regeneration | Rapid Pressurization by Feed Gas to Production Pressure |
| 6 | Regeneration | Continued Feed and Product Release |

Typical full cycles of two treatment zone processes having feed and product pressurization as embodied in the present invention are as follows:

| FLOW CHART IV | | |
|---|---|---|
| STEP | TREATMENT ZONE A | TREATMENT ZONE B |
| 1 | Pressurization by Product Backfill | Regeneration |
| 2 | Pressurization with Feed Gas | Regeneration |
| 3 | Continued Feed and Product Release | Regeneration |
| 4 | Regeneration | Pressurization by Product Backfill |
| 5 | Regeneration | Pressurization with Feed Gas |
| 6 | Regeneration | Continued Feed Product Release | or

| FLOW CHART V | | |
|---|---|---|
| STEP | TREATMENT ZONE A | TREATMENT ZONE B |
| 1 | Pressurization by Product Backfill to First Intermediate Pressure | Regeneration |
| 2 | Slow Pressurization by Feed Gas to Second Intermediate Pressure | Regeneration |
| 3 | Rapid Pressurization by Feed Gas to Production Pressure | Regeneration |
| 4 | Continued Feed and Product Release | Regeneration |
| 5 | Regeneration | Pressurization by Product Backfill |
| 6 | Regeneration | Slow Pressurization by Feed Gas to Intermediate Pressure |
| 7 | Regeneration | Rapid Pressurization by Feed Gas to Production Pressure |
| 8 | Regeneration | Continued Feed and Product Release |

Pressurization in multiple treatment zone systems may also optionally include a zone pressure equalization step either before or after the first stage or step of two stage fast/slow or two step backfill/feed pressurization processes, before the optional third step of a three stage fast/slow/optional continued feed pressurization process, or at the corresponding stages or steps in a combination two step, backfill two stage or three stage fast/slow/optional continued feed pressurization process. Equalization pressure is generally higher than regeneration pressure but less than production pressure.

Regeneration is accomplished by subjecting nearly saturated or saturated treatment zones to a reduced pressure (atmosphere and/or sub-atmospheric pressure) provided by a mechanical vacuum pump, by venting to the atmosphere, by flow of a purge gas containing little or none of the more-readily adsorbed components or by a combination of any of the above.

Referring to FIG. 12 in a two treatment zone system operated in accordance with Flow Charts IV or V with optional pressure equalization steps, zones A and B contain an adsorbent or combination of adsorbents that selectively remove one or more components from a feed gas stream. The valves 1 and 2 control the flow of feed gas to zones A and B, respectively, while the valves 9 and 10 control the flow of product from the two zones. Flow of the desorbed gases during regeneration is allowed by the operation of the valves 5 and 6. The valves 3, 4, 7, and 8, which are closed during all adsorption and desorption steps, open during the equalization step to allow the flow of gas from the inlet region and/or the outlet region of the zone at high pressure to the inlet region and/or outlet region of the zone at low pressure.

Following the equalization step, the valves 3, 4, 7, and 8 close, and repressurization is continued. If, for example zone A is to be repressurized while zone B is to be regenerated, valve 6 is opened for venting zone B while product gas is introduced to Bed A through the opening of valves 9, 11, and 12. The valve 12 in this schematic is not an actuatable valve like valves 1 through 11, but merely serves to throttle the backflow of product gas so as to control pressurization. In a like manner, the flow of feed gas to the conduit connecting the valves 1 and 2 is controlled by a similar throttling valve (not shown in this schematic) to allow for two step slow initial pressurization followed by rapid feed pressurization.

When the valves 9, 11, and 12 are open, a steady flow of product gas enters the zone for a period of time of between 5 and 10 seconds. The zone, which at the end of the equalization step was at a pressure between 40 and 50 percent of the production pressure, should finish backfilling at a pressure between 60 and 70 percent to the production pressure. At the end of the backfill step, valve 11 closes and valve 1 opens to allow the flow of the feed gas to proceed slowly into zone A. The flow-rate, controlled by a throttling valve upstream of the valves 1 and 2, is set to bring the pressure from 40 to 50 percent of the production pressure up to 90 to 100 percent of the production pressure within 70 percent of the remaining production time, typically 60 to 120 seconds for a 240 to 360 second full cycle time.

Figure 13:
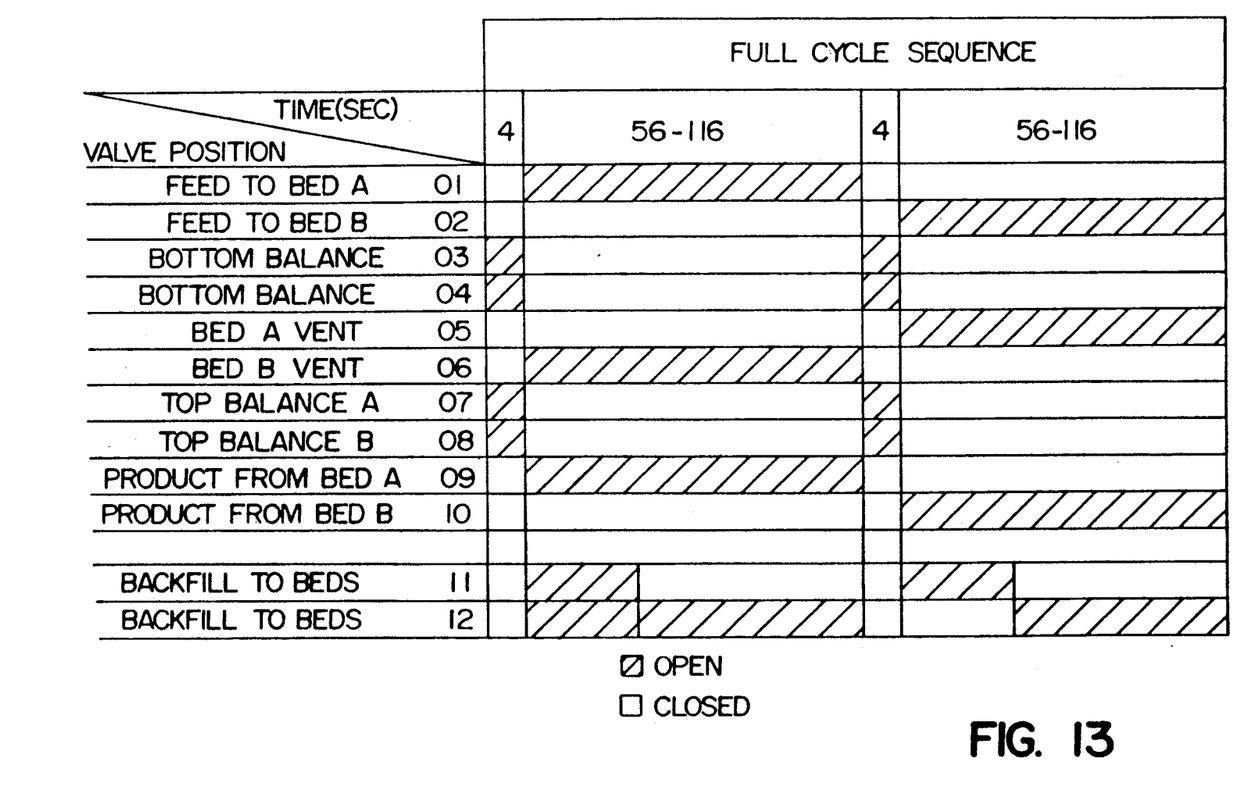
FIG. 13 is a chart of the sequence of steps in the PSA cycle using a PSA system having a pressurization accomplished by one step feed pressurization and product pressurization.

Typical timing and valve positions for this product and feed pressurization process above is shown in FIG. 13. Both combined product and feed pressurization processes use a typical full cycle time between 240 and 480 seconds.

The combined feed and product pressurization schemes establish multiple regions of varying inert-gas purity in the regenerated treatment zones upon repressurization. The region nearest the inlet of the treatment zone (the "first region") has a composition like that of the feed gas. The region just above the "first region" (the "second region") has a purity intermediate that of the feed gas and the product gas. The purity of the region above the "second region" (the "third region") is intermediate that of the "second region" and the product gas, and the region nearest the outlet (the "fourth region") has a purity like that of the product gas. Any additional regions of gas purity are introduced into the repressurizing PSA vessel in such a way that the purity of the additional region lies between the purities of its neighbors.

In combined product/feed gas pressurizations, product pressurization brings a treatment zone to from about 60 to about 70 percent of the production pressure.

All processes of the present invention typically are completed in from about 240 to about 480 seconds.

The initial periods of late profile feed gas pressurization typically is from about 75 to about 160 seconds, and feed gas flow rate during the initial period ranges from about 50 to about 120 scfh/cf adsorbent.

The second period typically is from about 10 the secondary period ranges from about 100 to about 350 scfh/cf adsorbent.

Product pressurization typically lasts from about 5 to about 10 seconds, and flow rate is from about 2.0 to about 5.0 scfh. Production pressure ranges from about 75 to about 150 psig and preferably about 85 psig.

The optional third stage of feed pressurization may be performed according to any feed history profile and last for any appropriate period. It will simply raise the production pressure further within the above defined production pressure range.

Regeneration pressure is typically 0 psig, initializing pressure typically ranges from about 65 to about 135 psig, secondary period pressure typically ranges from about 75 to about 150 psig, and backfill pressure typically ranges from about 45 to about 105 psig.

DESCRIPTION OF THE PREFERRED EMBODIMENTS

The following examples illustrate the invention without limitation. All parts are given by weight unless otherwise indicated.

EXAMPLES 1-4

A series of experimental runs was conducted utilizing a PSA unit as illustrated in FIG. 12, a range of cycle times from 240 to 360 seconds operating on the cycle shown in FIG. 13 with the second pressurization step continuing until a production pressure of 85 psig was achieved. Regeneration pressure was 0 psig. The treatment zones contained 45 cu. ft. of commercial carbon molecular sieve (CMS) (Kuraray Chemical Company—average diameter=2.5 mm for cylindrical pellets). The product backfill pressure ranged from 50 to 60 psig. A feed gas of compressed air was sent to the PSA treatment zones, from which purified nitrogen product gas was taken at opposite ends and an enriched oxygen waste gas was vented in a countercurrent direction.

The results are illustrated in Table 1.

COMPARATIVE EXAMPLES 1A*-4A*

A series of runs was conducted following the procedure of Example 1 substituting a PSA unit as illustrated in FIG. 10 operating on the cycle shown in FIG. 11.

The results are illustrated on Table b 1.

Examples 1-4 when compared with the corresponding Comparative Examples 1A*-4A* demonstrate a substantial improvement in plant production and product yield when the combined product and feed pressurization procedures of the present invention are employed.

TABLE 1

| | Product/Feed Pressurization | | | | | | | |
|---|---|---|---|---|---|---|---|---|
| Example | 1 | 1A* | 2 | 2A* | 3 | 3A* | 4 | 4A* |
| Cycle time (sec). | 360 | 360 | 360 | 360 | 240 | 240 | 240 | 240 |
| Product purity (vpm O$_2$) | 33 | 33 | 64 | 64 | 69 | 69 | 100 | 100 |
| N$_2$ Yield (relative %) | 2.21 | 2.01 | 2.77 | 2.46 | 2.23 | 1.66 | 2.55 | 2.11 |
| Productivity (relative scfh/cf(cms)) | 1.64 | 1.21 | 2.14 | 1.7 | 2.5 | 1.76 | 3.07 | 2.4 |

EXAMPLES 5-7

A series of experimental runs was conducted utilizing a PSA unit as illustrated in FIG. 12, a cycle time of 240 seconds operating on the cycle shown in FIG. 13, except that product gas pressurization was omitted and pressurization was done by the slow introduction of feed gas for an initial period until a intermediate pressure less than the production pressure but greater than equalization pressure was reached. Thereafter, the feed gas was introduced rapidly for a second period less than the initial period to raise the system to a production pressure of 85 psig similar to the pressure history of FIG. 7. The regeneration pressure was 0 psig. The treatment zone contained 45 cu. ft. of commercial carbon molecular sieve (cms)(Kuraray Chemical Company—average diameter=2.5 mm for cylindrical pellets). Purified nitrogen product gas was taken at the outlet and an enriched oxygen waste gas was vented in a countercurrent direction.

The results are illustrated in Table 2.

COMPARATIVE EXAMPLES 5A*-7A*

A series of runs was conducted following the procedure of Example 5 substituting a PSA unit as illustrated in FIG. 10 operating on the cycle shown in FIG. 11.

The results are illustrated in Table 2.

Examples 5-7 when compared with corresponding Comparative Examples 5A*-7A* demonstrate the substantial improvement of plant production and product yield using the two step "late profile" feed pressurization process of the present invention.

TABLE 2

| | Two Step Late Profile Feed Pressurization | | | | | |
|---|---|---|---|---|---|---|
| Example | 5 | 5A* | 6 | 6A* | 7 | 7A* |
| Cycle time (sec). | 240 | 240 | 240 | 240 | 240 | 240 |
| Product purity (vpm O$_2$) | 54 | 54 | 135 | 135 | 280 | 280 |
| N$_2$ Yield (relative %) | 2.37 | 1.40 | 3.13 | 2.42 | 3.49 | 3.12 |
| Productivity (relative scfh/cf(cms)) | 2.83 | 1.44 | 3.53 | 2.73 | 4.47 | 3.71 |

EXAMPLE 8

An experimental run was conducted utilizing a PSA unit as illustrated in FIG. 12, a cycle term of 240 seconds operating on the cycle shown in FIG. 13 with the second pressurization comprising the slow introduction of feed gas for an initial period until an intermediate pressure less than the production pressure but greater than equalization pressure was reached. Then, the feed gas was introduced rapidly for a second period less than the initial period to raise the pressure to a production pressure of 85 psig similar to the pressure history of FIG. 7. The regeneration pressure was 0 psig. The treatment zone contained 45 cu. ft. of commercial carbon molecular sieve (cms)(Kuraray Chemical Company—average diameter=2.5 mm). The product backfill pressure ranged from 50 to 60 psig.

Purified nitrogen product gas was taken at the outlet end and an enriched oxygen white gas was vented in a countercurrent direction.

The results are illustrated in Table 3.

COMPARATIVE EXAMPLE 8A*

A run was conducted following the procedure of Example 8, substituting a PSA unit as illustrated in FIG. 10, operating on the cycle shown in FIG. 11.

The results are illustrated in Table 3.

Example 8, when compared with Comparative Example 8A*, demonstrates the substantial improvement on plant production and product yield using the combined product and two step "late profile" feed pressurization process of the present invention.

TABLE 3

| | Product And Two Step Late Profile Feed Pressurization | |
|---|---|---|
| Example | 8 | 8A* |
| Cycle time (sec). | 240 | 240 |
| Product purity (vpm O$_2$) | 1000 | 1000 |
| N$_2$ Yield (relative %) | 4.07 | 3.73 |
| Productivity (relative scfh/cf(ms)) | 6.23 | 5.53 |

EXAMPLES 9-11

A series of experimental runs was conducted utilizing a PSA unit and a pressurization step comprising product pressurization and one step feed pressurization, a cycle of 360 seconds, a backfill pressure of from 10 to 20 psig, a production pressure of 85 psig, a regeneration pressure of 0 psig, and a specific feed of 71 scfh air/cf CMS. The adsorbent was carbon molecular sieve. A feed gas of air was sent to the PSA treatment zones, from which purified nitrogen gas was taken at the outlet end and an enriched oxygen waste gas was vented in a countercurrent direction.

Results are summarized in Table 4.

COMPARATIVE EXAMPLES 12*-15*

A series of experimental runs was conducted following the procedure of Example 11 but using a pressurization step of one step feed gas pressurization.

Results are summarized in Table 4.

Examples 9-11 and Comparative Examples 12*-15* illustrate that both productivity and yield are increased by the method of the present invention and that the effect of backfill does not appear to be determined by the amount of gas adsorbed, but on the purity of the interstitial gas.

The optimum amount of pressure increase during backfill appears to be 10 psig.

TABLE 4

| | Product/Feed Pressurization | | | | | | |
|---|---|---|---|---|---|---|---|
| Example | 9 | 10 | 11 | 12* | 13* | 14* | 15* |
| Backfill Pressure Drop psi (sec) | 20 (8) | 20 (8) | 20 (8) | 0 (0) | 0 (0) | 0 (0) | 0 (0) |
| $O_2$ PPM | 33 | 56 | 64 | 23 | 50 | 90 | 144 |
| $N_2$ Yield (relative %) | 2.21 | 2.61 | 2.77 | 1.70 | 2.28 | 2.77 | 3.02 |
| Productivity (relative scfh/cf cms) | 1.64 | 2.01 | 2.14 | 1.07 | 1.70 | 2.09 | 2.39 |

EXAMPLES 16–18

A series of experimental runs was conducted utilizing a PSA system with a two step feed pressurization having a profile as illustrated in FIG. 8, a cycle time of 240 seconds, a production pressure of 85 psig, a regeneration pressure of 0 psig and a specific range of 0.75. The adsorbent was carbon molecular sieve.

Results are summarized in Table 5.

COMPARATIVE EXAMPLES 19*–25*

The procedure of Examples 16–18 was followed substituting a feed pressurization profile as illustrated in FIG. 1.

The results are summarized in Table 5.

COMPARATIVE EXAMPLES 26*–36*

The procedure of Examples 14–16 was followed substituting a feed pressurization profile as illustrated in FIG. 4.

The results are summarized in Table 5.

Examples 16–18 when compared with Comparative Examples 19*–36* demonstrate the improved productivity and/or yield that two step late feed pressurization in accordance with the present invention imparts over constant or two step early feed pressurization.

Many variations of the present invention will suggest themselves to those skilled in the art in light of the above, detailed description. All such modifications and variations are within the full intended scope of the appended claims.

We claim:

1. A process for the production of a highly purified inert product gas from a feed gas containing said inert gas and impurities, comprising:
   (a) pressurizing to a production pressure, a treatment zone comprising an inlet region, an outlet region, and at least one impurity adsorbing material, by
      (i) first slowly introducing said feed gas for an initial period into said inlet region to raise the pressure of said treatment zone to an intermediate pressure less than said production pressure; subsequently
      (ii) rapidly introducing the same or a different feed gas for a second period less than said initial period into said inlet region to raise the pressure of said treatment zone to said production pressure; and optionally
      (iii) introducing the same or a different feed gas as in steps (i) and (ii) for a further period to raise further the pressure of said treatment zone;
   (b) introducing the same or different feed gas to the production pressurized treatment zone through said inlet region to remove said impurities and to produce said highly purified inert product gas;
   (c) removing said product gas from said outlet region.

2. The process of claim 1 wherein said feed gas comprises air and said inert gas comprises nitrogen.

TABLE 5

| | Two Step Feed Pressurization | | | | | | | | | | | |
|---|---|---|---|---|---|---|---|---|---|---|---|---|
| Example | 16 | 17 | 18 | 19* | 20* | 21* | 22* | 23* | 24* | 25* | 26* | 27* |
| Feed Profile^A (L, C, E) | L | L | L | C | C | C | C | C | C | C | E | E |
| $O_2$ (PPM) | 54 | 135 | 280 | 15 | 38 | 69 | 99 | 130 | 230 | 525 | 69 | 76 |
| $N_2$ Yield (relative %) | 2.36 | 3.12 | 3.48 | 1.0 | 1.62 | 1.83 | 2.1 | 2.23 | 2.67 | 3.34 | 1.36 | 1.40 |
| Productivity (relative scfh/cf cms) | 2.81 | 3.51 | 4.44 | 1.0 | 1.71 | 2.04 | 2.51 | 2.71 | 3.16 | 4.27 | 1.44 | 1.46 |

| Example | 28* | 29* | 30* | 31* | 32* | 33* | 34* | 35* | 36* |
|---|---|---|---|---|---|---|---|---|---|
| Feed Profile^A (L, C, E) | E | E | E | E | E | E | E | E | E |
| $O_2$ (PPM) | 83 | 92 | 106 | 175 | 205 | 243 | 495 | 585 | 630 |
| $N_2$ Yield (relative %) | 1.55 | 1.62 | 1.84 | 2.16 | 2.29 | 2.45 | 3.03 | 3.18 | 3.26 |
| Productivity (relative scfh/cf cms) | 1.67 | 1.89 | 2.04 | 2.46 | 2.63 | 2.90 | 3.69 | 3.99 | 4.16 |

^A = L = Late as in FIG. 7
C = Constant as in FIG. 1
E = Early as in FIG. 4

All patents, applications, publications, and test methods above are hereby incorporated by reference.

3. The process of claim 2 wherein said nitrogen gas contains no more than 10,000 ppm of oxygen.

4. The process of claim 1 wherein said impurity adsorbing material is selected from the group consisting of zeolite, zeolite molecular sieve, carbon molecular sieve, activated carbon, silica compounds, alumina compounds, or a combination of any of the foregoing.

5. The process of claim 11 wherein step (c) comprises:
   (i) simultaneously removing said inert product gas from said outlet region;
   (ii) sequentially removing said inert product gas from said outlet region; or
   (iii) a combination of (i) and (ii).

6. The process of claim 1 further comprising (d) regenerating said treatment zone to thereby remove said impurities from said impurity adsorbing material.

7. The process of claim 6 wherein steps (a)–(d) are conducted in a plurality treatment zones, at least one of said treatment zones being used to remove said impurities from said feed gas and at least one of said treatment zones being simultaneously regenerated to remove impurities contained therein.

8. The process of claim 7 which includes an equalization step either before step (a)(i), before step (a)(ii) or before step (a)(iii).

9. The process of claim 1 wherein the intermediate pressure obtained in step (a)(i) is in the range of from about 65 psig to about 150 psig.

10. The process of claim 1 wherein said production pressure is in the range of from about 75 to about 150 psig.

11. The process of claim 1 wherein said initial period is in the range of from about 75 to about 160 seconds.

12. The process of claim 11 wherein the flow rate of said feed gas during said initial period is in the range of from about 50 to about 120 scfh/cf adsorbent.

13. The process of claim 1 wherein said second period is in the range of from about 10 to about 70 seconds.

14. The process of claim 13 wherein the flow rate of said feed gas during said second period is in the range of from about 100 to about 350 scfh/cf adsorbent.

15. A process for the production of highly purified inert product gas from a feed gas containing said inert product gas and impurities, comprising:
   (a) pressurizing to a production pressure, a treatment zone comprising an inlet region, an outlet region, and at least one impurity adsorbing material, by
      (i) introducing said inert product gas into said outlet region to raise the pressure of said treatment zone to a first intermediate pressure less than said production pressure; and
      (ii)
         (1) first slowly introducing said feed gas for an initial period into said inlet region to raise the pressure of said treatment zone to a second intermediate pressure which is less than said production pressure; subsequently
         (2) rapidly introducing the same or a different feed gas for a second period less than said initial period into said inlet region to raise the pressure of said treatment zone to said production pressure; and optionally
         (3) introducing the same or a different feed gas as in steps (1) or (2) for a further period to raise further the pressure of said treatment zone;
   (b) introducing the same or a different feed gas to the production pressurized treatment zone through said inlet region to remove said impurities and to produce said highly purified inert product gas;
   (c) removing said inert product gas from said outlet region.

16. The process of claim 15 wherein said feed gas comprises air and said inert gas comprises nitrogen.

17. The process of claim 16 wherein said nitrogen gas contains no more than 10,000 ppm of oxygen.

18. The process of claim 15 wherein said impurity adsorbing material is selected from the group consisting of zeolite, zeolite molecular sieve, carbon molecular sieve, activated carbon, silica compounds, alumina compounds, or a combination of any of the foregoing.

19. The process of claim 15 wherein step (c) comprises:
   (i) simultaneously removing said inert product gas from said outlet region;
   (ii) sequentially removing said inert product gas from said outlet region; or
   (iii) a combination of (i) and (ii).

20. The process of claim 15 further comprising (d) regenerating said treatment zone to thereby remove said impurities from said impurity adsorbing material.

21. The process of claim 20 wherein steps (a)–(d) are conducted in a plurality of treatment zones, at least one of said treatment zones being used to remove said impurities from said feed gas and at least one of said treatment zones being simultaneously regenerated to remove impurities contained therein.

22. The process of claim 15 wherein the intermediate pressure obtained in step (a)(i) is in the range of from about 65 psig to about 150 psig.

23. The process of claim 15 wherein said production pressure is in the range of from about 75 to about 150 psig.

24. The process of claim 15 wherein said initial period is in the range of from about 75 to about 160 seconds.

25. The process of claim 15 wherein the flow rate of said feed gas during said initial period is in the range of from about 50 to about 120 scfh/cf adsorbent.

26. The process of claim 15 wherein said second period is in the range of from about 10 to about 70 seconds.

27. The process of claim 15 wherein the flow rate of feed gas during said period is in the range of from about 100 to about 350 scfh/cf adsorbent.

28. The process of claim 15 which includes as equalization step either before step (a)(i), before step (a)(ii)(1), before step (a)(ii)(2), or before step (a)(ii)(3).

* * * * *

UNITED STATES PATENT AND TRADEMARK OFFICE
CERTIFICATE OF CORRECTION

PATENT NO. : 5,082,474
DATED     : January 21, 1992
INVENTOR(S) : Arthur I. Shirley, et al.

It is certified that error appears in the above-indentified patent and that said Letters Patent is hereby corrected as shown below:

Column 12, line 36, change "and" to --or--.

Column 13, line 6, change "claim 11" to --claim 1--.

Column 14, line 51, after "rate of" insert --said--.

line 52, after "said" insert --second--.

Signed and Sealed this

Ninth Day of November, 1993

*Attest:*

BRUCE LEHMAN

*Attesting Officer*     *Commissioner of Patents and Trademarks*